United States Patent
Park

[11] Patent Number: 5,903,398
[45] Date of Patent: May 11, 1999

[54] ZOOM LENS SYSTEM

[75] Inventor: Cheon-Ho Park, Seongnam-si, Rep. of Korea

[73] Assignee: Samsung Aerospace Industries, Ltd., Changwon-si, Rep. of Korea

[21] Appl. No.: 08/996,289

[22] Filed: Dec. 22, 1997

[30] Foreign Application Priority Data

Dec. 30, 1996 [KR] Rep. of Korea ............... 96-78434

[51] Int. Cl.⁶ .................................................... G02B 15/14
[52] U.S. Cl. ........................... 359/686; 359/683; 359/685
[58] Field of Search ................................. 359/686, 683, 359/676, 685

[56] References Cited

U.S. PATENT DOCUMENTS

| | | | |
|---|---|---|---|
| 5,493,447 | 2/1996 | Ohtake | 359/686 |
| 5,528,427 | 6/1996 | Tanaka et al. | 359/683 |
| 5,642,224 | 6/1997 | Suzuki | 359/676 |
| 5,666,231 | 9/1997 | Ohtake | 359/686 |
| 5,815,320 | 9/1998 | Hoshi et al. | 359/686 |

*Primary Examiner*—Georgia Epps
*Assistant Examiner*—Jordan M. Schwartz
*Attorney, Agent, or Firm*—Howrey & Simon

[57] ABSTRACT

A zoom lens system including a first lens group of a positive refractive power having two lenses which moves linearly toward an object for a magnification change; a second lens group of a negative refractive power at least having one lens of a negative refractive power and one lens of a positive refractive power adhered thereto; a third lens group of a positive refractive power which moves non-linearly toward the object for a magnification changes; and a fourth lens group of a negative refractive power which moves linearly toward the object for a magnification change.

3 Claims, 9 Drawing Sheets

ZOOM LENS SYSTEM

BACKGROUND OF THE INVENTION (a) Field of the Invention

The present invention relates to a zoom lens system, more particularly to a zoom lens system for a single lens reflex camera capable of compensating a change of an introversive coma at a telephoto position.

(b) Description of the Related Art

A conventional zoom lens system for a single lens reflex camera includes a first lens group of a positive refractive power which is movable toward an object along an optical axis for a magnification change, a second lens group of a negative refractive power which is fixed, a third lens group of a positive refractive power compensating an image plane when changing a magnification, and a fourth lens group of a negative refractive power which is movable toward an object as the first lens group moves for a magnification change.

However, the conventional zoom lens system with four lens groups has a problem of an introversive coma at a telephoto position, where an off-axis aberration varies greatly because an exit angle of an incident light beam entering the lens at an arbitrary angle changes as the fourth lens group moves.

SUMMARY OF THE INVENTION

In view of the shortcomings of the prior art described above, it is an object of the present invention to provide a zoom lens system capable of compensating an introversive coma at a telephoto position where an off-axis aberration is compensated.

To achieve this object and in accordance with the purpose of the invention, the zoom lens system comprises;

a first lens group of a positive refractive power that moves linearly toward an object when changing a magnification;

a second lens group of a negative refractive power which is fixed against the image plane;

a third lens group of a positive refractive power that moves non-linearly toward the object when changing a magnification; and a fourth lens group of a negative refractive power that moves linearly toward the object when changing a magnification.

The zoom lens system according to the present invention also satisfies following conditions:

$$0.3 \times f_w \leq f_{3,4} \leq 0.5 \times f_w$$

$$0.2 \times f_1 \leq |f_2| \leq 0.4 \times f_1$$

where $f_w$ is a focal length of the zoom lens system at a wide angle position, $f_{3,4}$ is an effective focal length of the third lens group and the fourth lens group, $f_2$ is a focal length of the second lens group, and $f_1$ is a focal length of the first lens group.

BRIEF DESCRIPTION OF THE DRAWINGS

The above object and features of the present invention will be apparent from the following description of the preferred embodiment with reference to the accompanying drawings.

DETAILED DESCRIPTION OF THE PREFERRED EMBODIMENTS

Reference will now be made to the preferred embodiments of the present invention, examples of which are illustrated in the accompanying drawings.

Figure 1A:
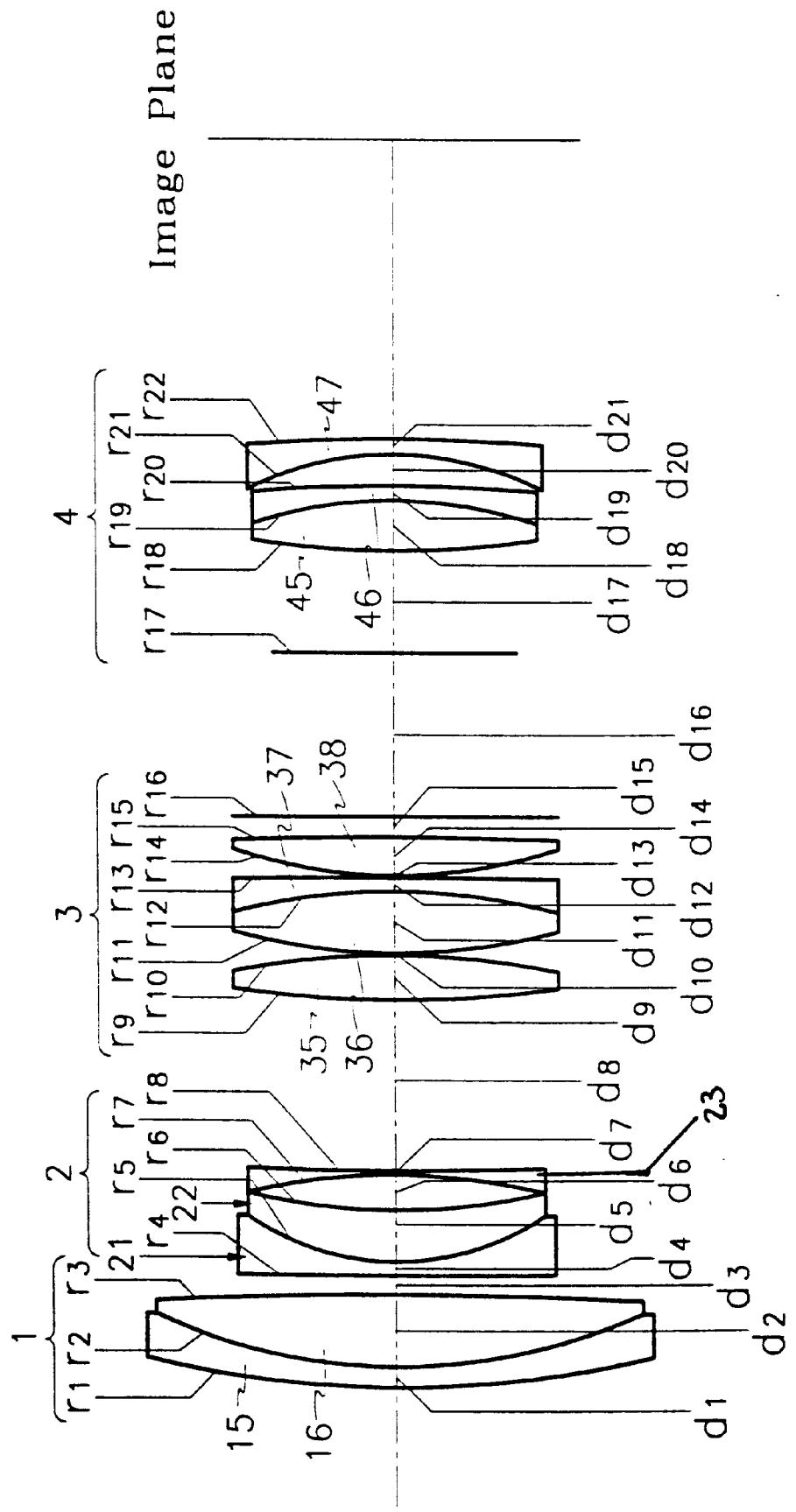
FIG. 1A is a sectional view illustrating a lens group of a zoom lens system at a wide angle position in accordance with a preferred embodiment of the present invention.
Figure 1B:
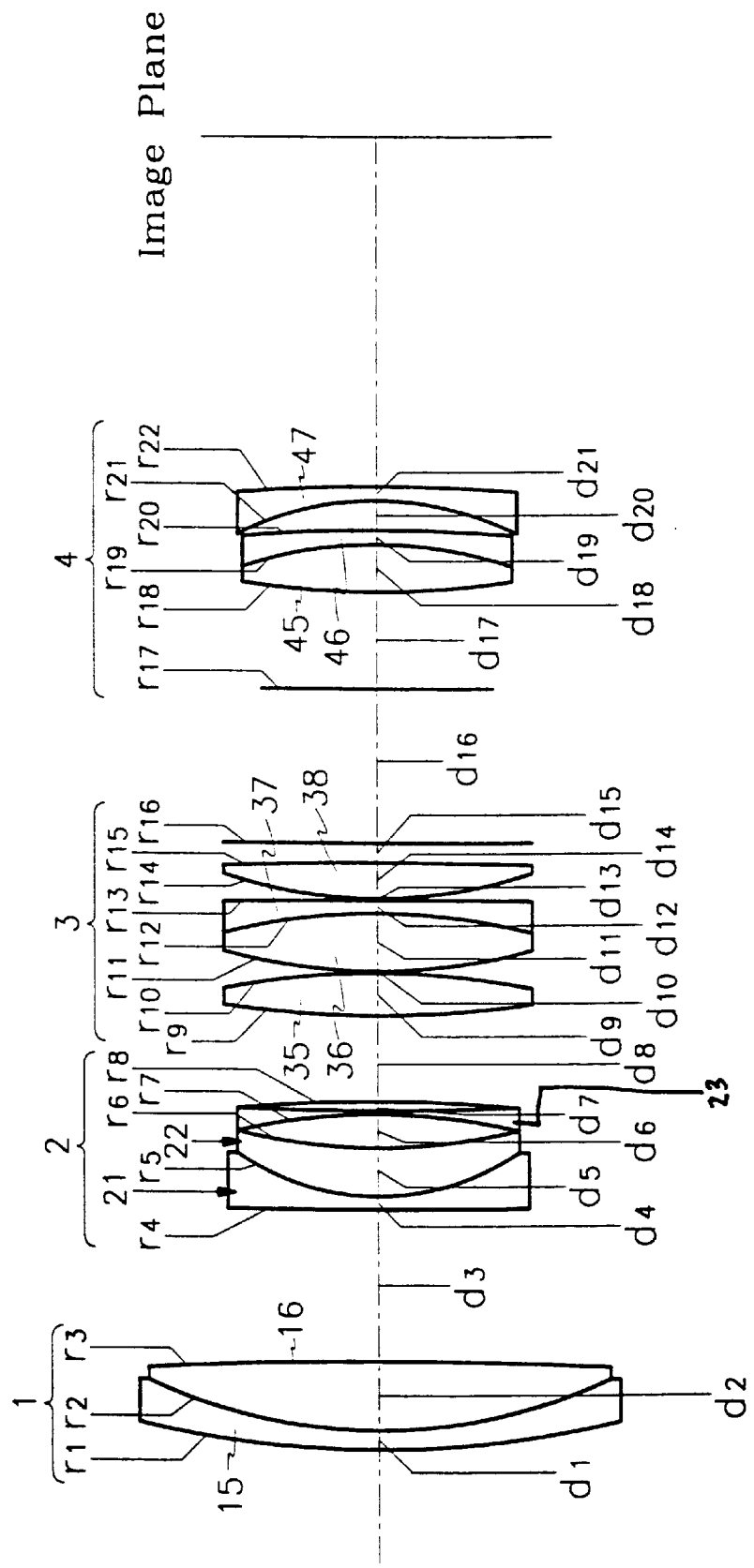
FIG. 1B is a sectional view illustrating a lens group of a zoom lens system at a normal position in accordance with a preferred embodiment of the present invention.
Figure 1C:
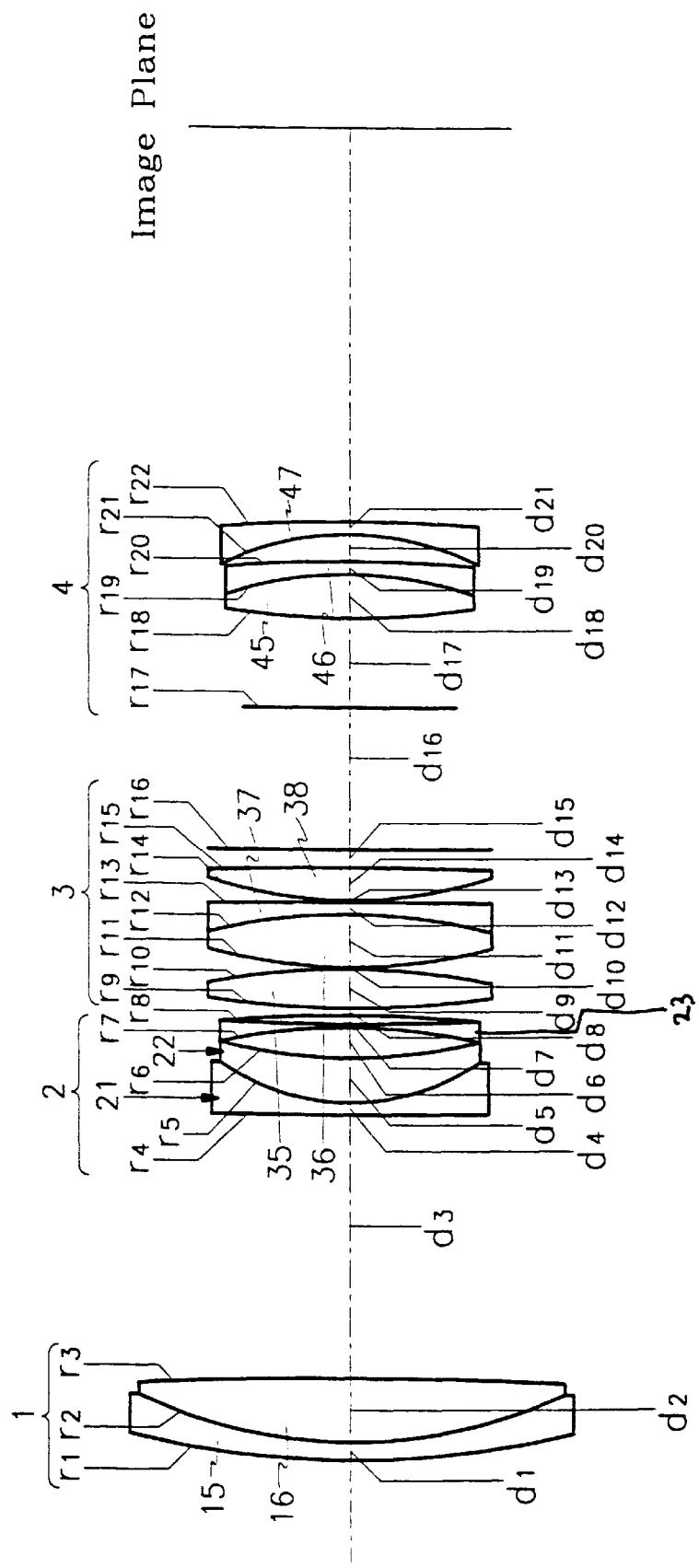
FIG. 1C is a sectional view illustrating a lens group of a zoom lens system at a telephoto position in accordance with a preferred embodiment of the present invention.

Referring to FIGS. 1A–1C, a zoom lens system in accordance with the preferred embodiment of the present invention includes counting from the object side, a first lens group 1 of a positive refractive power having two lenses which is linearly movable toward an object for a magnification change, a second lens group 2 of a negative refractive power having three lenses which is fixed against the image plane, a third lens group 3 of a positive refractive power having four lenses which is non-linearly movable toward the object for a magnification change, and a fourth lens group 4 of a negative refractive power having three lenses which is linearly movable toward an object for a magnification change.

The first lens group 1 has one concave lens 15 which is concave toward an image plane, and one convex lens 16 adhered thereto. The second lens group 2 has a first lens 21 of a negative refractive power which is concave toward an image plane, a second lens 22 of a positive refractive power which is concave toward an image plane and is adhered to the first lens 21, and a third lens 23 of a negative refractive power which is concave toward an object. Because the second lens group 2 has a negative refractive power, the light received thereby is diverged. Therefore, the second lens group 2 compensates an introversive coma.

The third lens group 3 has two double convex lenses 35, 36 and one meniscus lens 37 which is concave toward an object, and one convex lens 38.

The fourth lens group 4 has a double convex lens 45 and two meniscus lenses 46, 47, one of which is adhered to the double convex lens.

To change the magnification, the first lens group 1 moves linearly toward an object and a second lens group 2 is fixed against an image plane. The third lens group 3 moves non-linearly toward the object as the first lens group 1 moves, and the fourth lens group 4 moves linearly toward the object according to the third lens group 3.

The first lens group 1 is composed of two lenses, converges the light entering from the object side. The light refracted by the first lens group 1 enters the second lens group 2 having three lenses, and finally diverges. The first lens 21 of a negative refractive power and the second lens 22 of a positive refractive power of the second lens group 2 correct an introversive coma caused by the axis aberration to improve the quality of the image.

The third lens group 3 has four lenses, and converges the light received from the second lens group 2. The fourth lens group 4 has three lenses, and diverges the light received from the third lens group 3. In addition, the zoom lens system in accordance with the first and second preferred embodiments of the present invention satisfies the following conditions:

$$0.3 \times f_w \leq f_{3,4} \leq 0.5 \times f_w \quad (1)$$

$$0.2 \times f_1 \leq |f_2| \leq 0.4 \times f_1 \quad (2)$$

where $f_w$ is a focal length of the zoom lens system at a wide angle position, $f_{3,4}$ is an effective focal length of the third lens group and the fourth lens group, $f_2$ is a focal length of the second lens group, and $f_1$ is a focal length of the first lens group.

Condition 1 focuses on the minimization of the total length of the zoom lens system. That is, condition 1 defines an optimum range of the focal length of the third lens group 3.

When the effective focal length $f_{3,4}$ of the third lens group 3 and the fourth lens group 4 exceeds the upper limit in condition 1, the focal length $f_3$ of the third lens group 3 becomes long. The longer focal length results in a longer distance between two conjugate points of the third lens group 3, which causes the total length of the zoom lens system to be long. On the other hand, when the effective focal length $f_{3,4}$ of the third lens group 3 and the fourth lens group 4 is below the lower limits in condition 1, a focal length $f_3$ of the third lens group 3 becomes too short. A too-short focal length $f_3$ of the third lens group 3 makes it difficult to compensate all the aberrations such as spherical aberration.

When the absolute value $|f_2|$ of the focal length $f_2$ of the second lens group 2 is below the lower limit in condition 2, it is difficult to decrease the influence of the divergent power of the second lens group 2 while keeping the zoom lens size compact. On the other hand, when the absolute value $|f_2|$ exceeds the upper limit in condition 2, lenses with large aperture sizes are needed to compensate the decreased amount of oblique ray.

The data according to the first preferred embodiment of the present invention is shown in Table 1. In accordance with the first preferred embodiment, the F number ranges from 4 to 5.8, and the focal length ranges from 71.5 mm to 201.7 mm. In the tables, r represents a radius of curvature, d represents a distance between lenses or thickness of a lens, nd represents a refractive power for d-line, and v represents an Abbe number of a lens. In each of these Tables, all units of length are denominated in millimeters.

TABLE 1

| Surface No. | Radius of Curvature(ri) | Distance(di) | Refractive Index(nd) | Abbe Number(v) |
|---|---|---|---|---|
| 1 | 82.78000 | 1.5000 | 1.80518 | 25.46 |
| 2 | 43.93800 | 5.2800 | 1.65844 | 50.85 |
| 3 | −337.05300 | A | | |
| 4 | 1422.87600 | 1.0000 | 1.63854 | 55.45 |
| 5 | 19.63200 | 3.7200 | 1.80518 | 25.46 |
| 6 | 47.09200 | 2.5800 | | |
| 7 | −47.36700 | 1.0000 | 1.77250 | 49.62 |
| 8 | 113.79500 | B | | |
| 9 | 87.85700 | 3.2700 | 1.48749 | 70.44 |
| 10 | −60.00000 | 0.1500 | | |
| 11 | 47.37000 | 4.4800 | 1.51680 | 64.20 |
| 12 | −47.54400 | 1.0000 | 1.80518 | 25.46 |
| 13 | 833.76900 | 0.1500 | | |
| 14 | 38.80300 | 2.7800 | 1.48749 | 70.44 |
| 15 | 336.35900 | 1.5000 | | |
| 16 | 0.00000 | C | | |
| 17 | 0.00000 | 12.4500 | | |
| 18 | 71.42000 | 3.6900 | 1.64769 | 33.84 |
| 19 | −33.15400 | 1.1000 | 1.63854 | 55.45 |
| 20 | −126.31300 | 2.2900 | | |
| 21 | −24.18600 | 1.1000 | 1.77250 | 49.62 |
| 22 | −141.40300 | | | |

A, B, and C represent variable distances between surfaces in accordance with the wide angle position, the normal position, and the telephoto position, as shown in Table 2. $B_f$ represents a back focal length.

TABLE 2

| Focal Length(f) | Wide Angle Position(f = 71.5) | Normal Position(f = 109.0) | Telephoto Position(f = 201.7) |
|---|---|---|---|
| A | 1.251 | 20.396 | 39.663 |
| B | 20.673 | 13.758 | 1.282 |
| C | 18.998 | 18.234 | 19.005 |
| $B_f$ | 37.496 | 45.175 | 56.880 |
| $f_{3,4}$ | 31.15 | 31.37 | 31.15 |

Figure 2A:
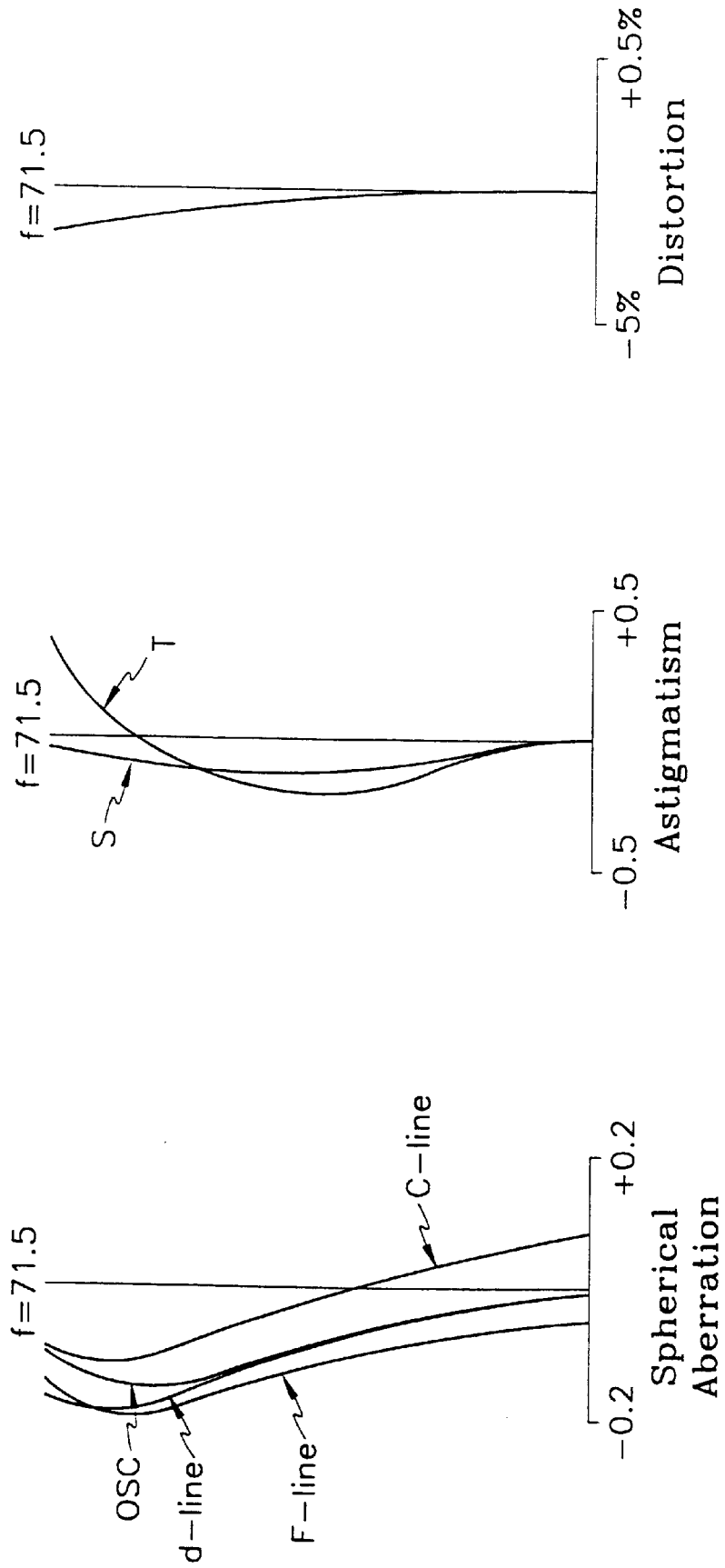
FIG. 2A is a view illustrating aberrations of the zoom lens system at a wide angle position in accordance with a first preferred embodiment of the present invention.
Figure 2B:
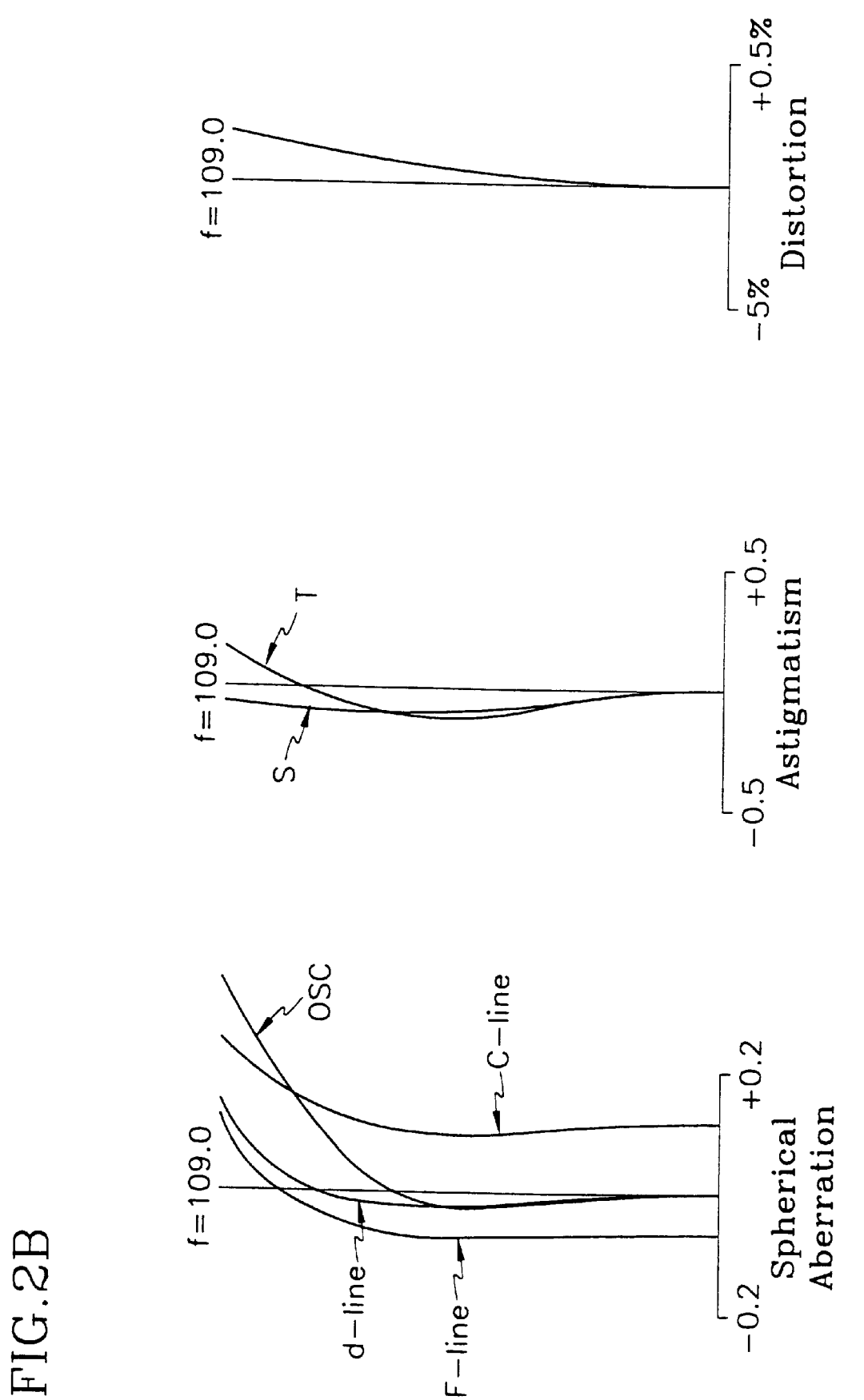
FIG. 2B is a view illustrating aberrations of the zoom lens system at a normal position in accordance with the first preferred embodiment of the present invention.
Figure 2C:
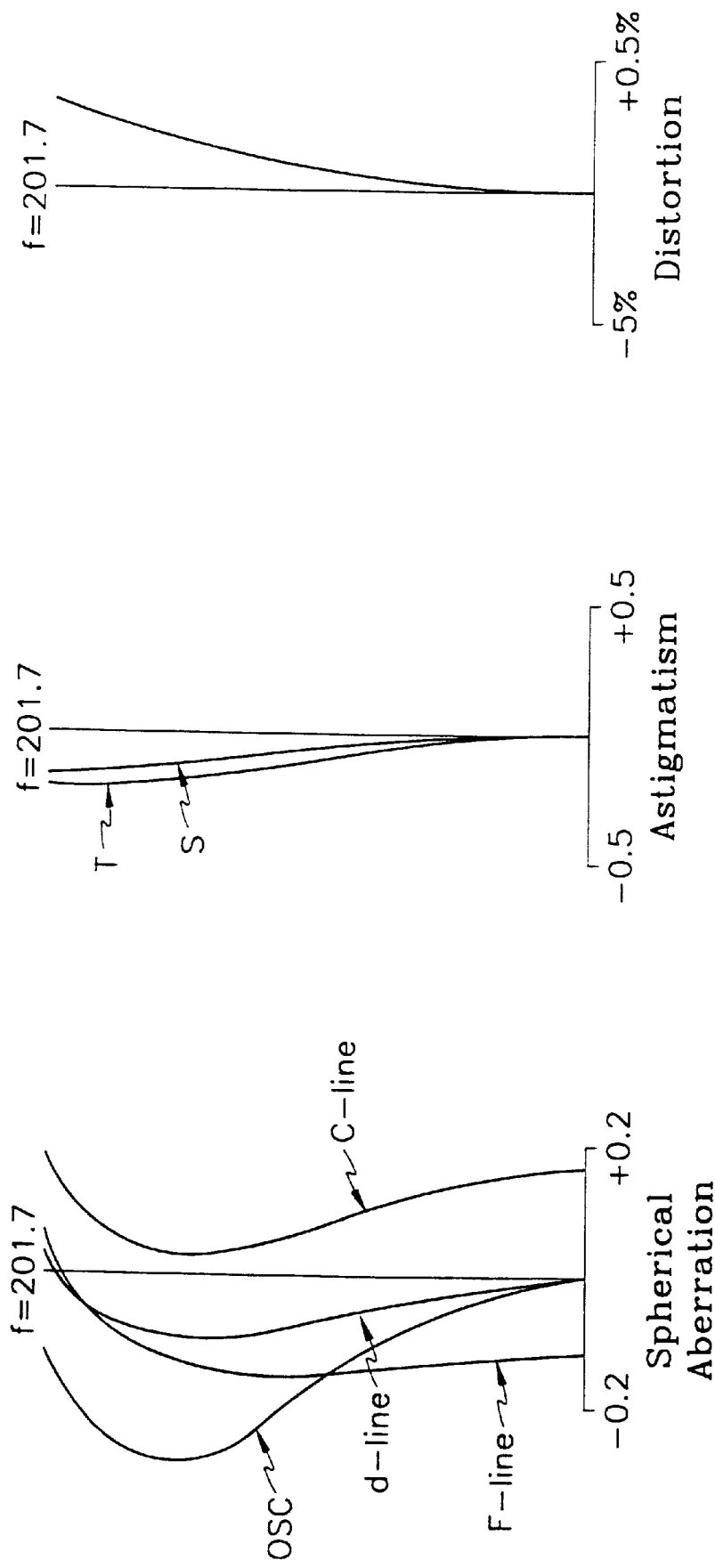
FIG. 2C is a view illustrating aberrations of the zoom lens system at a telephoto position in accordance with the first preferred embodiment of the present invention.

The focal length $f_1$ of the first lens group 1 according to the first preferred embodiment of the present invention is 120.31 mm, the focal length $f_2$ of the second lens group 2 according to the first preferred embodiment of the present invention is −32.19 mm. FIGS. 2A, 2B, and 2C illustrate spherical aberration, astigmatism, and distortion of the zoom lens system in accordance with the first preferred embodiment at wide angle, normal, and telephoto positions, respectively.

The data according to the second preferred embodiment of the present invention is shown in Table 3. In accordance with the second preferred embodiment of the present invention, the F number ranges from 4 to 5.8, and the focal length ranges from 71.3 mm to 201.8 mm.

TABLE 3

| Surface No. | Radius of Curvature(ri) | Distance(di) | Refractive Index(nd) | Abbe Number(v) |
|---|---|---|---|---|
| 1 | 81.87800 | 1.6000 | 1.80518 | 25.46 |
| 2 | 43.44200 | 5.6300 | 1.65844 | 50.85 |
| 3 | −336.23900 | A | | |
| 4 | −321.81100 | 1.2000 | 1.63854 | 55.45 |
| 5 | 19.95200 | 3.4300 | 1.80518 | 25.46 |
| 6 | 53.67000 | 2.1100 | | |
| 7 | −52.98800 | 1.0000 | 1.77250 | 49.62 |
| 8 | 97.11000 | B | | |
| 9 | 71.99500 | 3.2600 | 1.51155 | 67.67 |
| 10 | −71.99500 | 0.1500 | | |

TABLE 3-continued

| Surface No. | Radius of Curvature(ri) | Distance(di) | Refractive Index(nd) | Abbe Number(v) |
|---|---|---|---|---|
| 11 | 47.30900 | 4.5000 | 1.51680 | 64.20 |
| 12 | −47.30900 | 1.1000 | 1.83606 | 24.25 |
| 13 | 6110.30800 | 0.1500 | | |
| 14 | 44.90200 | 2.6000 | 1.51680 | 64.20 |
| 15 | 509.90600 | 1.4300 | | |
| 16 | 0.00000 | C | | |
| 17 | 0.00000 | 12.4500 | | |
| 18 | 66.81200 | 3.4300 | 1.64769 | 33.84 |
| 19 | −37.44700 | 1.1000 | 1.63854 | 55.45 |
| 20 | −160.95500 | 2.5000 | | |
| 21 | −24.35300 | 1.1000 | 1.77250 | 49.62 |
| 22 | −134.81100 | | | |

A, B, and C represent variable distances between surfaces in accordance with the wide angle position, the normal position, and the telephoto position, as shown in Table 4. $B_f$ represents a back focal length.

TABLE 4

| Focal Length(f) | Wide Angle Position(f = 71.3) | Normal Position(f = 108.8) | Telephoto Position(f = 201.8) |
|---|---|---|---|
| A | 1.593 | 20.657 | 39.794 |
| B | 20.673 | 13.760 | 1.282 |
| C | 18.998 | 18.234 | 19.006 |
| $B_f$ | 37.505 | 45.182 | 56.888 |
| $f_{3,4}$ | 31.06 | 31.28 | 31.06 |

The focal length $f_1$ of the first lens group 1 according to the second preferred embodiment of the present invention is 119.28 mm, the focal length $f_2$ of the second lens group 2 according to the second preferred embodiment of the present invention is −32.19 mm.

Figure 3A:
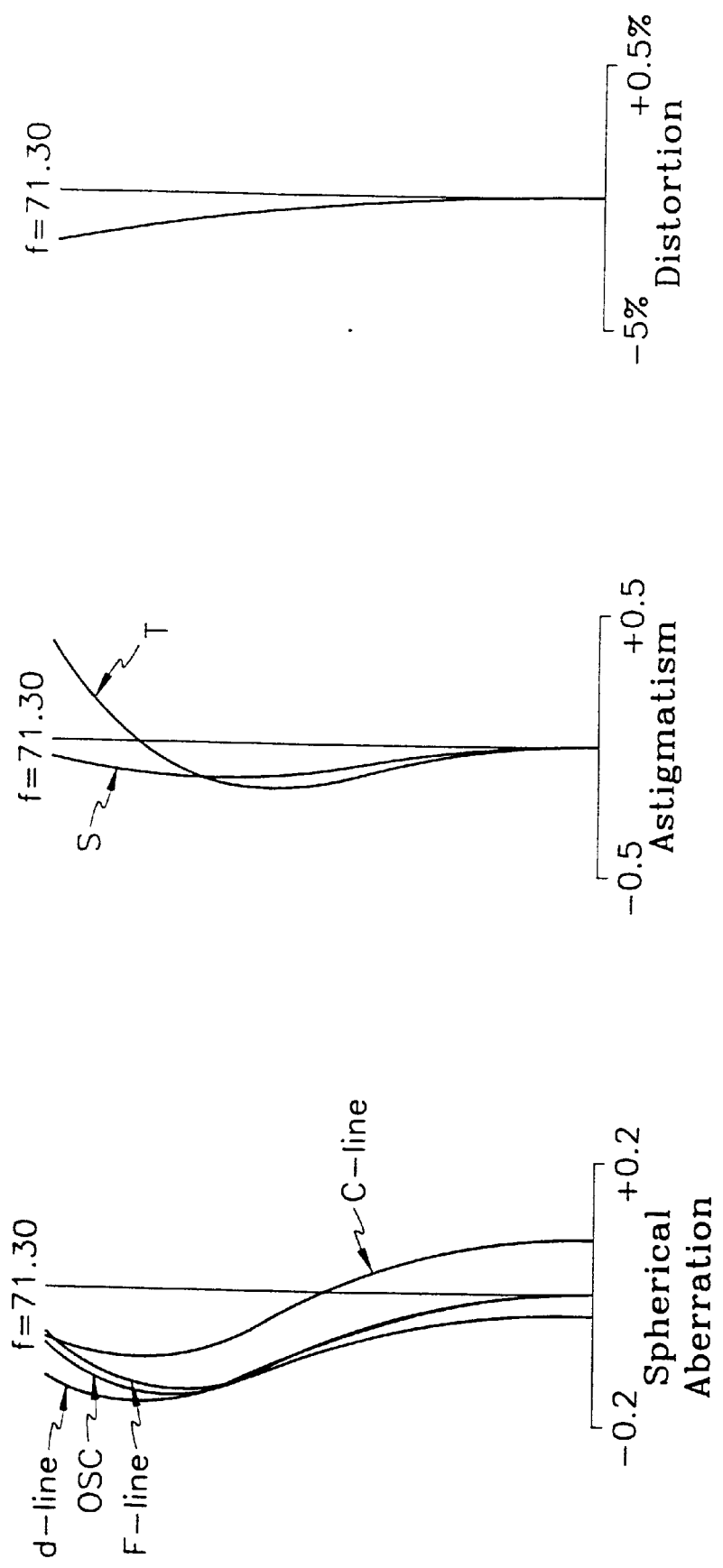
FIG. 3A is a view illustrating aberrations of the zoom lens system at a wide angle position in accordance with a second preferred embodiment of the present invention.
Figure 3B:
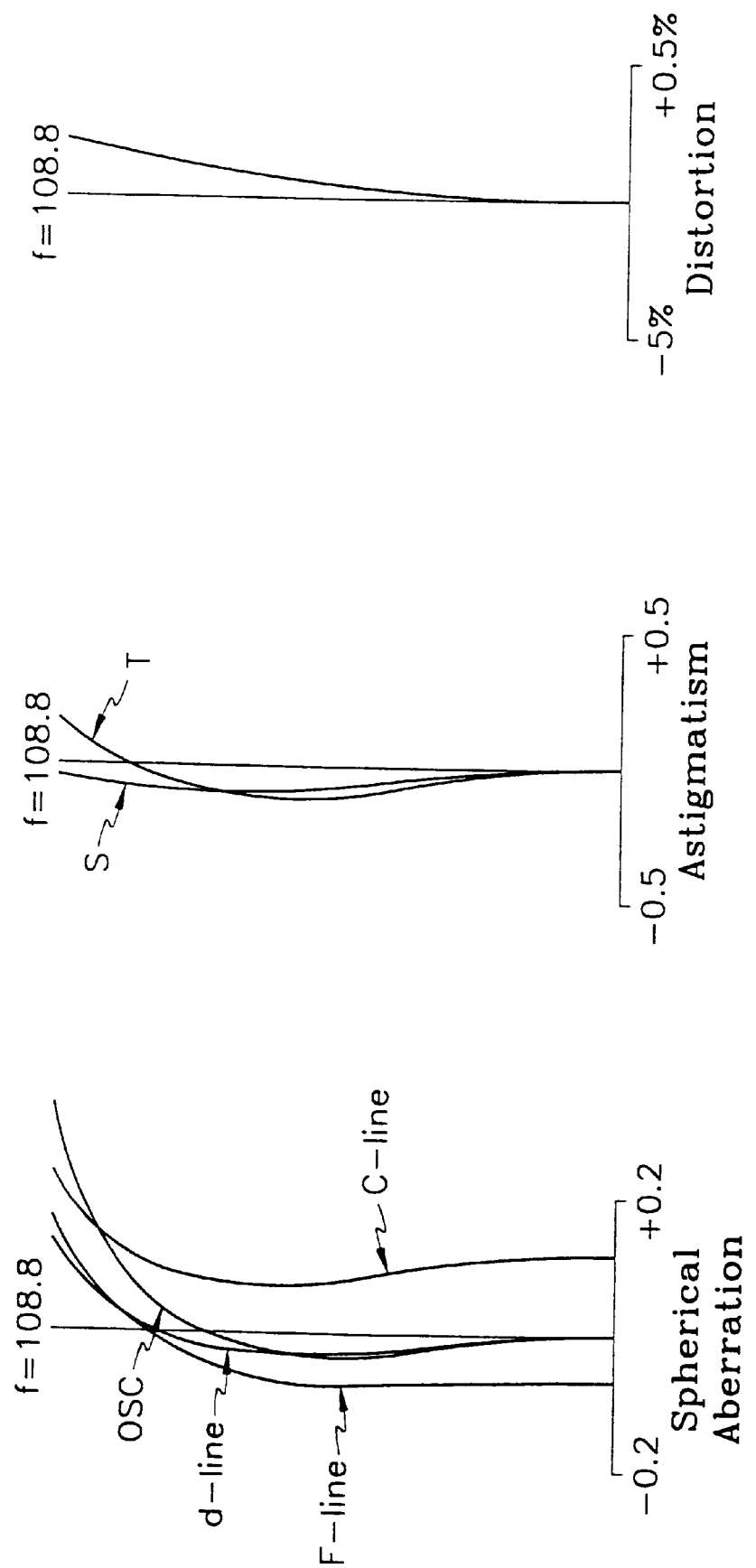
FIG. 3B is a view illustrating aberrations of the zoom lens system at a normal position in accordance with the second preferred embodiment of the present invention.
Figure 3C:
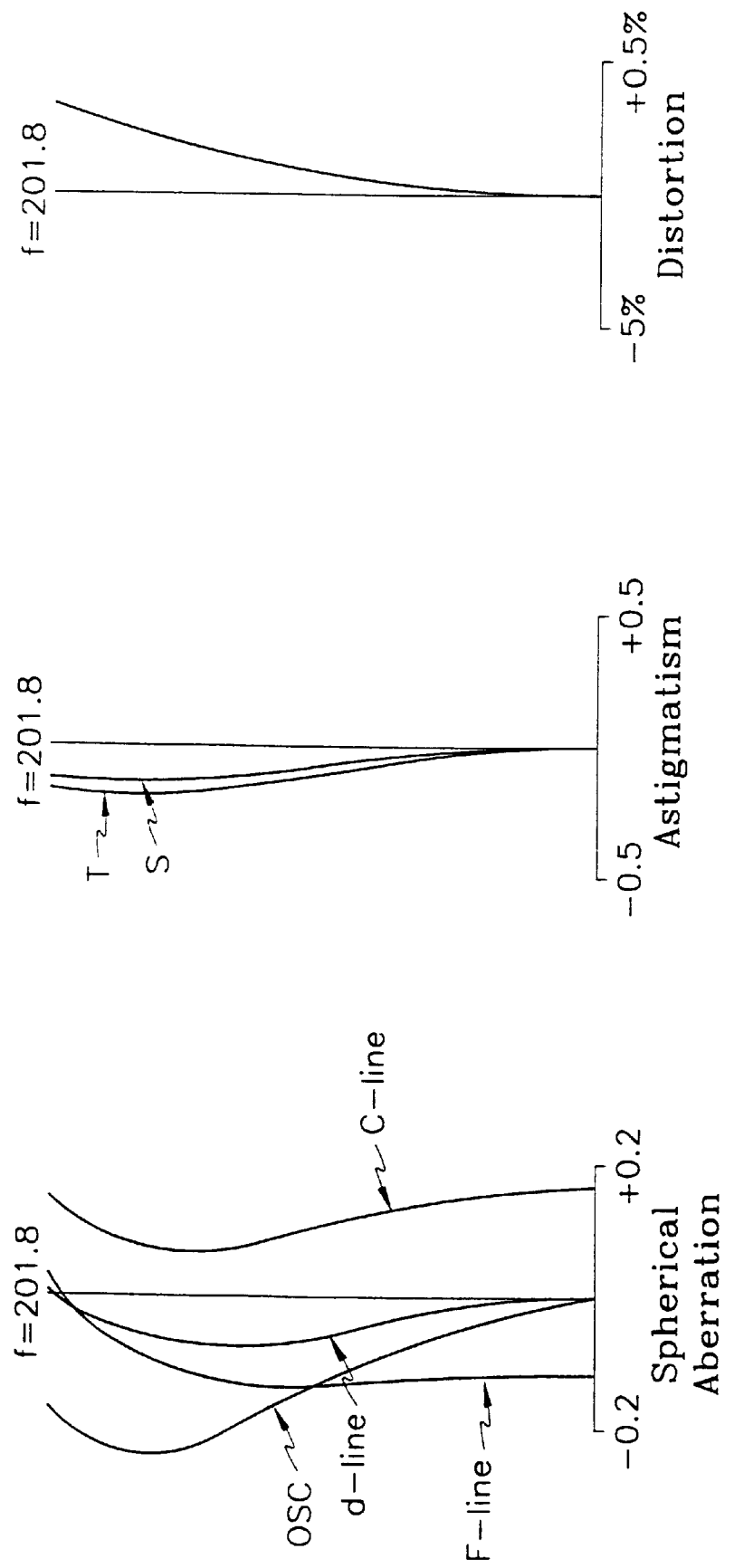
FIG. 3C is a view illustrating aberrations of the zoom lens system at a telephoto position in accordance with the second preferred embodiment of the present invention.

FIGS. 3A, 3B, and 3C illustrate spherical aberration, astigmatism, and distortion of the zoom lens system in accordance with the second preferred embodiment at wide angle, normal, and telephoto positions, respectively.

As described above, the effect of the zoom lens system in accordance with the preferred embodiments of the present invention lies in that it is able to obtain good image quality because coma is corrected at the telephoto position. Moreover, the ratio of the intensity of the surrounding radiation becomes high.

While it has been shown and described the preferred embodiments of the invention, it will be obvious to those skilled in the art that various changes and modifications can be readily made therein without departing from the scope and spirit of the invention as defined by the appended claims.

What is claimed is:

1. A zoom lens system comprising when viewed from an object side:

a first lens group of a positive refractive power which moves linearly toward the object for a magnification change;

a second lens group of a negative refractive power which is fixed;

a third lens group of a positive refractive power which moves non-linearly toward the object for a magnification change; and a fourth lens group of a negative refractive power which moves linearly toward the object for a magnification change, wherein $$0.3 \times f_w \leq f_{3,4} \leq 0.5 \times f_w$$

$$0.2 \times f_1 \leq |f_2| \leq 0.4 \times f_1$$

where $f_w$ is a focal length of the zoom lens system at a wide angle position, $f_{3,4}$ is an effective focal length of the third lens group and the fourth lens group, $f_2$ is a focal length of the second lens group, and $f_1$ is a focal length of the first lens group.

2. The zoom lens system of claim 1, wherein the first lens group includes a convex lens and a concave lens adhered thereto.

3. The zoom lens system of claim 1, wherein the second lens group includes at least a concave lens and a meniscus lens adhered thereto.

* * * * *